3,253,027
METHOD OF PREPARING BORON DIALKYL
MONOHALIDES
Giacomo Lazzari and Ermanno Susa, both of Novara, Italy, assignors to Montecatini, Società Generale per l'Industria Mineraria e Chimica, Milan, Italy, a corporation of Italy
No Drawing. Filed July 10, 1961, Ser. No. 122,642
Claims priority, application Italy, July 14, 1960, 12,371/60
12 Claims. (Cl. 260—543)

The present invention relates to a new method for the preparation of boron dialkyl monohalides from boron trihalides and Grignard compounds.

The boron dialkyl monohalides prepared according to the method of this invention are especially valuable as polymerization catalysts.

Several methods of preparing boron alkyl halides are known to the art. According to one of these methods, boron dialkyl monohalides are obtained by treating a boron trialkyl compound with either a hydrohalogen acid or with free halogen or with boron trihalides.

In addition, methods for preparing boron dialkyl monohalides by reacting compounds of the type $BX_3$ (wherein X represents a halogen or hydrogen) with zinc or aluminum organometallic compounds are known.

Attempts to prepare boron alkyl halides directly by starting from other metal alkyl halides, particularly from Grignard compounds, have been hitherto unsuccessful (see Buls, Davis, Thomas: J. Amer. Chem. Soc., 79, 337 (1957)).

Applicants have now surprisingly found that, in contrast to what is stated in the cited literature, boron alkyl monohalides may be prepared directly from Grignard compounds of the type MgXR, when ethereal solutions of said compounds are reacted, in certain definite proportions, with boron halides.

An object of this invention is therefore to provide a new method for the preparation of boron dialkyl monohalides of type $BXR_2$, wherein X represents a halogen and R represents an alkyl group.

Other objects and advantages of the present invention will become apparent as the description proceeds.

This method generally comprises reacting a compound of type MgRX, wherein R and X have the above stated meaning, in an ethereal solution with a boron trihalide or its etherate, in a molar ratio 2:1.

We have found that when operating according to the present invention, and maintaining $MgRX/BX'_3$ ratio of 2:1, substantially the following reaction occurs:

$$2MgRX + BX'_3 = MgXX' + MgX'_2 + BXR_2 \quad (1)$$

As can be seen a characteristic of this reaction is that the halogen X', present in the boron trihalide employed, does not become part of the formed boron alkyl monohalide, but combines entirely with magnesium to form an inorganic salt, whereas about half of the halogen present in the Grignard compound moves to form the boron alkyl monohalide, and about half of said halogen forms an inorganic magnesium halide.

The reaction between the Grignard compound and the boron trihalide or its etherate is carried out in ethereal solution, while employing an ether containing at least 4 carbon atoms, preferably dibutyl ether. Into this ethereal solution of the Grignard compound, a boron trihalide or its pure etherate is gradually introduced, this etherate also being formed using an ether containing at least 4 carbon atoms, preferably dibutyl ether.

Since the reaction is exothermic, the temperature of the mixture is preferably adjusted by varying the addition rate of the boron trihalide compound. The best yields are obtained at a temperature of about +50° C., although there is no critical temperature limit. A temperature in the range of 40° to 80° C. is preferable.

When the reaction between MgXR and $BX'_3$ or its etherate is completed, all of the volatile portion of the reaction product is separated from the inorganic salts by means of distillation without rectification, in a very short column.

The thus obtained volatile portion is then subjected to fractionation, using a very efficient column. In this operation a small amount of pure boron trialkyl which result of the following side reaction:

$$3MgRX + BX'_3 = 3MgXX' + BR_3$$

(wherein R, X and X' have the above stated meaning) will separate. This $BR_3$ generally comes off as the tops or bottoms, depending on the characteristics of the particular halogen and alkyl. The high-boiling ether remains as the final, higher boiling distillation liquid.

The yields of boron alkyl monohalides obtained vary depending on the particular monohalide prepared.

According to a preferred embodiment of the present invention, X is Br and R is an alkyl group with 1 to 5 carbon atoms, preferably 2 carbon atoms.

In comparison with prior art methods, appreciable advantages are offered by the method of preparing boron dialkyl monohalides of the present invention. First of all, the use of pure organometallic compounds, which are spontaneously inflammable and dangerous, is avoided. In contrast, the ethereal solutions of Grignard compounds are relatively easy to handle and safe.

Secondly, a heretofore necessary process step is eliminated. When the boron monohalide is prepared by employing Grignard compounds, according to the known art techniques, the Grignard compound must be reacted with the boron trihalide, in order to obtain pure boron trialkyl, and subsequently the latter must be converted to boron monohalide. In contrast thereto, according to the present method, the boron dialkyl monohalide is directly obtained without such an intervening step.

Thirdly, the boron trihalide required for the reaction may be employed in the form of an etherate, which etherate is more easily prepared and more easily handled than those other boron compounds employed as starting materials in known processes.

The following examples are submitted to illustrate and not to limit the present invention.

*Example 1*

A butyl-ether solution of ethylmagnesium bromide is prepared by reacting 12 g. of metallic magnesium chips with 49.5 g. of pure ethyl bromide, dissolved in 105 g. of dibutyl ether, under conventional Grignard reaction conditions.

165 g. of this solution, containing 60.5 g. of $$Mg(C_2H_5)Br$$

(0.454 mole) are charged, while under a nitrogen stream, into a flask provided with a stirring device, reflux condenser and a tap funnel containing 45.13 g. (0.227 mole) of boron trifluoride butyl etherate. The etherate is obtained by dissolving gaseous $BF_3$ in dibutyl ether, and rectifying the etherate by distillation under reduced pressure.

Boron trifluoride etherate is now added dropwise to the ethyl magnesium bromide solution, under vigorous stirring, while adjusting the addition so that the liquid temperature, which increases due to the exothermic reaction, is kept near to 50° C. When the temperature begins to decrease after the addition of about ⅔ of the total amount to be reacted, the addition may be completed by slightly heating the reaction mixture.

After the addition of boron trifluoride etherate is completed, the stirring is continued for about half an hour more, and then the reaction product is distilled without rectification until dryness. Gases are released during this distillation which will be combined with other gases released in the subsequent rectifying operation.

The distilled liquid is now subjected to rectification in an efficient fractionating column. First the gaseous, low-boiling products originating from the decomposition of $Mg(C_2H_5)Br$ and containing about 60% of ethane (B.P. $-80°$ C.) and about 40% butylenes (B.P. about $-2°$ C.) come off. A first condensate is collected between 93° and 99° C., which condensate is spontaneously inflammable and is composed in great part of boron triethyl. The second fraction, collected at 100–101° C., is a colorless, heavy liquid, which has a characteristic smell and is not combustible. This second fraction is made up of

20 g. of the first fraction containing 30.37% Br and 21 g. of the second fraction containing 50.6% Br are obtained.

The solid residue contains 18.8 g. of bromine and is composed prevailingly of the inorganic salt of magnesium.

Since 36.4 g. Br (as ethyl bromide) are reacted, about 50% thereof is left in the residue, whereas about 50% is present in the distillate as organic bromine.

The two distilled bromine-containing fractions are subjected to further rectification, and 19.8 g. of pure boron diethyl monobromide (98% purity as shown by chromatographic analysis in vapor phase) are obtained, which is a 60% yield based on the theoretical value given in Equation 1. A further 11.0 g. of monobromide passes with the boron triethyl at about 85° C., probably in the form of an azeotropic mixture. This monobromide compound is easily recovered by recycling this fraction in subsequent operations. Accordingly, on the whole, 30.8 g. of $$B(C_2H_5)_2Br$$

are obtained, which is a 91% yield with respect to Equation 1.

The isolated pure compound shows the following characteristics—

Analysis of $B(C_2H_5)_2Br$—Found: C 34.2%, H 6.88%, Br 53.2%. Calculated: C 32.2%, H 6.70%, Br 53.7%.

Physical characteristics:

$n_D^{20} = 1.4332$  $D_4^{20} = 1.2092$
M.P.$= -124°$C.  B.P.$= 100.5°$ C./754 mm. Hg

*Example 2*

The reaction is carried out by operating as in Example 1, but using $Mg(C_2H_5)Cl$ instead and employing the same molar proportions of organomagnesium compound and $BF_3$ butyl etherate. The ethereal solution of the Grignard compound appears semisolid, however, at a temperature of 50° C. it is sufficiently fluid so as to regularly react with the boron trifluoride etherate. Remarkably lower yields of organic chlorine occur, that is, about 25% of the chlorine formerly present in the organomagnesium compound is recovered in the volatile portion, while the remainder is left in the solid residue.

By rectification of the volatile portion first at temperatures between 70–79° C., a fraction of pure boron diethyl monochloride is obtained. Upon a second rectification at between 85–100° C., a boron triethyl fraction, which contains very little chlorine (about 10% of the chlorine recovered in the volatile portion) is obtained.

The halogenated product after further rectification shows, upon chromatographic analysis in the vapor phase, a 97.6% purity, and exhibits the following characteristics—

Analysis of $B(C_2H_5)_2Cl$: Found: C 47.0%, H 9.8%, Cl 35.0%. Calculated: C 46.0%, H 9.55%, Cl 33.2%.

Characteristics:

$D_4^{20} = 0.8835$
$n_4^{20} = 1.4010$
M.P.$= -130.5°$ C.

*Example 3*

This example is conducted by operating in the manner of Examples 1 and 2, but using $Mg(C_2H_5)I$ and employing the same molar proportions between the latter and the $BF_3$ etherate. At the end of the reaction, the volatile iodine recovered in the distillate is equal to 42% of the amount initially introduced in the form of $(C_2H_5)I$. Only a minor part (about 11.9%) of the organic iodine recovered as a volatile product passes as the first fraction mixed with boron triethyl and this may be recycled. The main part distills as monohalogenated product at about 127–130° C. (77%). The remaining iodine (11.1%) is left in the fractionation residual liquid. This latter is also recoverable, if it is recycled in subsequent operations. On the whole, the volatile iodinated compounds are obtained in an approximate yield of 84% with respect to Equation 1.

The rectified monoiodinated compound shows the following characteristics:

$n_4^{20} = 1.4788$; $D_4^{20} = 1.4513$; B.P.$= 129.6°$ C./752 mm.

Iodine content:

|  | Percent |
|---|---|
| Measured | 62.8 |
| Theoretical | 64.8 |

Boron trifluoride, the other boron halides or their etherates may be substituted for the $BF_3$ butyl etherate in the above working examples and equivalent results are obtained.

Many variations and modifications can of course be practised without departing from the spirit of our invention.

Having thus described the present invention, what we desire to secure and claim by Letters Patent is:

1. A method of preparing boron dialkyl monohalides of the formula $BXR_2$, wherein X represents a halogen atom and R represents an alkyl group containing 1 to 5 carbon atoms, which comprises reacting, at a temperature of from 40° to 80° C. in ether solution, wherein the ether contains at least 4 carbon atoms, a compound of the formula MgRX wherein R and X have the above stated meaning, and a boron compound selected from the group consisting of boron trihalide and boron trihalide etherate, in a MgRX to boron compound ratio of about 2 to 1, the halogen in the compound $BXR_2$ being provided from the compound MgRX.

2. A method according to claim 1, wherein the reaction is carried out at a temperature of about 50° C.

3. A method according to claim 1, wherein R represents an ethyl group.

4. A method according to claim 1, wherein X represents a bromine atom.

5. A method according to claim 1, wherein X represents a chlorine atom.

6. A method according to claim 1, wherein X represents an iodine atom.

7. A method according to the claim 1, wherein boron trifluoride butyl etherate is employed as the boron compound.

8. A method according to the claim 1, wherein dibutyl ether is employed as said ether solution.

9. A method according to claim 1, wherein the reaction is carried out by adding the boron compound dropwise to the MgRX while maintaining efficient stirring.

10. A method according to claim 1, wherein magnesium diethyl bromide is reacted with said boron compound to produce boron diethyl monobromide.

11. A method according to claim 1, wherein magnesium diethyl monochloride is reacted with said boron compound to produce boron diethyl monochloride.

12. A method according to claim 1, wherein magnesium diethyl monoiodide is reacted with said boron compound to produce boron diethyl monoiodide.

References Cited by the Examiner

UNITED STATES PATENTS 2,921,954   1/1960   Ramsden _____ 260—543
2,930,743   3/1960   Schecter et al. _____ 204—165

OTHER REFERENCES

Becher: "Chem. Abstracts," vol. 52, p. 2538i (1958).
Gerrard et al.: "J. Chem. Soc. (London)" (1957), part 3, pp. 3828–3833.
Gerrard: The Organic Chemistry of Boron, 1961, page 81.
Hennion et al.: "J. Am. Chem. Soc.," vol. 79 (1957), pp. 5190–5191.
Johnson et al.: "J. Am. Chem. Soc.," vol. 60 (1938), pp. 115–121 (page 118 relied on).
Schabacher et al.: "Chem. Abstracts," vol. 52, p. 12556d (1958).

LORRAINE A. WEINBERGER, *Primary Examiner.*

LEON ZITVER, *Examiner.*

R. K. JACKSON, B. M. EISEN, *Assistant Examiners.*